United States Patent Office.

JOSEPH AMBROSE, OF NASHVILLE, TENNESSEE.

Letters Patent No. 95,407, dated October 5, 1869.

IMPROVED MEDICAL COMPOUND OR CORDIAL.

The Schedule referred to in these Letters Patent and making part of the same.

I, JOSEPH AMBROSE, of the city of Nashville, county of Davidson, State of Tennessee, have invented a certain Medical Compound, to be called by the name of Ambrose Cordial.

Said compound is as follows, to wit:
Three gallons of water.
Two pounds of logwood.
Four ounces of spice.
One ounce of cloves.
One ounce of cinnamon.

Boil the whole down to one and one-quarter gallon; then add two pounds crushed sugar, one quart best neutral whiskey; mix thoroughly; then ready for use.

I claim said Letters Patent for the following reasons, to wit:

First, said medicine has a cooling and healthful effect in all cases of a disorganized state of the bowels, such as flux, chronic diarrhœa, &c.

Second, in all cases of summer complaint of children, it is invaluable as a remedy.

Third, in all cases of inflammation of the bowels, it has a healing and comfortable effect.

Claim.

I claim as my invention—

The manufacture or preparation of a compound, which I denominate as Ambrose Cordial, of the ingredients, in the proportions, and for the purposes set forth.

JOSEPH AMBROSE.

Witnesses:
J. F. KEER,
HENRY LANGFORD.